No. 854,334. PATENTED MAY 21, 1907.
H. CRUSE.
CONSTRUCTION OF VALVE CASINGS.
APPLICATION FILED JUNE 14, 1906.
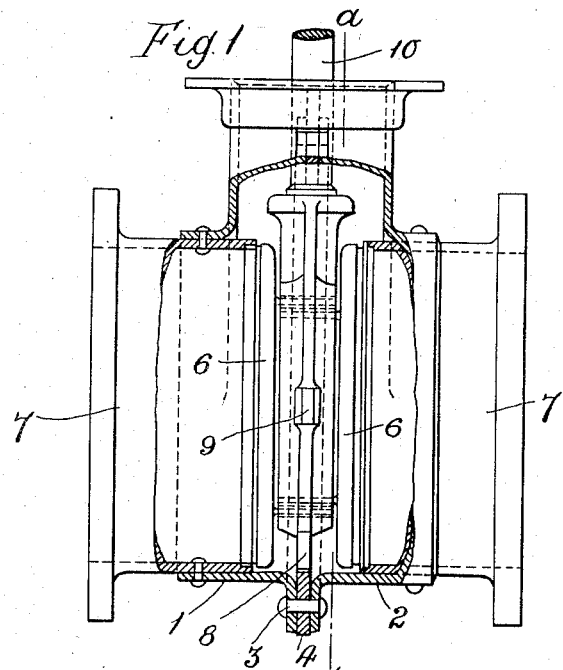
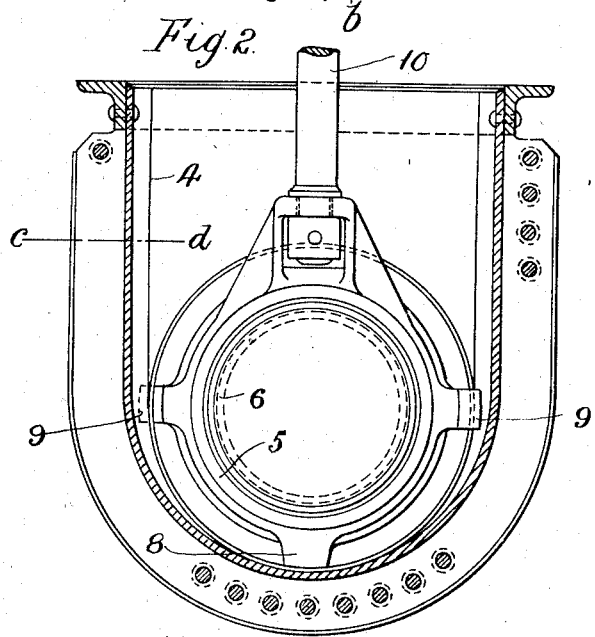
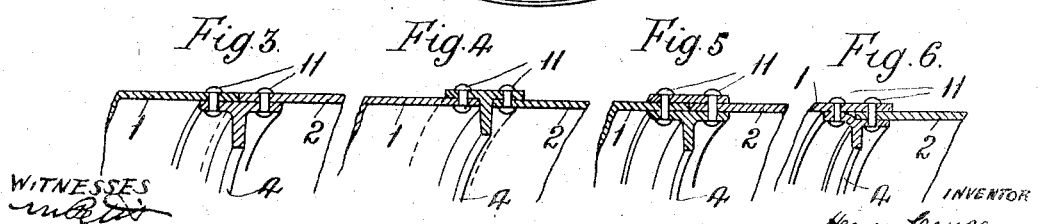

UNITED STATES PATENT OFFICE.

HENRY CRUSE, OF BLACKLEY, NEAR MANCHESTER, ENGLAND.

CONSTRUCTION OF VALVE-CASINGS.

No. 854,334.  Specification of Letters Patent.  Patented May 21, 1907.

Application filed June 14, 1906. Serial No. 321,694.

*To all whom it may concern:*

Be it known that I, HENRY CRUSE, a subject of Great Britain, residing at 16 and 18 Charlestown, Blackley, near Manchester, in the county of Lancaster, England, have invented new and useful Improvements in the Construction of Valve-Casings, of which the following is a specification.

My invention relates to improvements in the construction of valve casings chiefly applicable for the type of valves commonly termed "full way valves."

In the accompanying sheet of drawings—Figure 1 is a sectional elevation of a full way valve and its casing, the latter made in accordance with my improvements. Fig. 2 is a sectional elevation of the same taken on the plane of the line $a-b$, Fig. 1. Figs. 3, 4, 5 and 6 are sectional views of different ways of making the joint between the two wrought metal dishes and the valve guide and are supposed to be taken on the plane of the line $c-d$, Fig. 2.

In carrying my improvements into effect I form the valve casing of two pressed, stamped or wrought dishes 1, 2, of wrought iron or steel. These parts 1 and 2 are flanged and are united by bolts or rivets 3 passing through the flanges of the dishes 1, 2, as well as through an intermediate calking ring 4, preferably also of wrought metal. The calking ring 4 extends far enough into the interior of the casing to act as a guide for the valve bridle 5 which is fitted to slide to and fro therein. The valve bridle 5 has two valve disks 6 fitted in it and these have their seatings on the ends of two flanged pipe pieces or sockets 7 riveted or welded into the mouths of the parts 1 and 2. The valve bridle 5 has also a stop piece 8 and two guide forks 9 formed upon it and the latter embrace the projecting portion of the calking ring 4. A spindle or rod 10 is secured to the valve bridle 5 in order to operate the valve.

The calking ring 4 might be of T section, as shown in Figs. 3 and 4, and the dishes 1 and 2 in that case need not be flanged but would be united by bolts or rivets 11 passing through the flanges of the calking ring 4 and the edges of the dishes.

In Fig. 3 the edges of the dishes 1, 2, abut and the flanged calking ring 4 is placed entirely inside the valve casing, whereas, in Fig. 4, the flanges of the calking ring 4 lie outside the valve casing and the shank or straight portion at right angles to the flanges divides the two edges of the dishes 1, 2, and projects between them into the interior of the valve casing. Again, in Fig. 5 the calking ring 4 is flanged and secured as in Fig. 3 with this addition that a butt strap 12 is placed outside over the joint and the bolts or rivets 11 pass through it and the flanges.

In Fig. 6 the ends of the dishes 1 and 2 overlap and the edge of the inner one is beveled off and then the flanged calking ring 4 is laid upon the joint and secured thereon by the bolts or rivets 11.

What I claim and desire to secure by Letters Patent of the United States is:—

A valve casing comprising two wrought metal dish shaped members, a calking ring extending from the junction of said members into the casing, and a slide valve in the casing, the calking ring forming a guide for the valve.

In testimony whereof I have signed my name to this specification in the presence of two subscribing witnesses.

HENRY CRUSE.

Witnesses:
S. W. GILLETT,
HERBERT R. ABBEY.